United States Patent [19]
Yasui et al.

[11] Patent Number: 5,289,965
[45] Date of Patent: Mar. 1, 1994

[54] METHOD OF SUPERPLASTICALLY FORMING AND BRAZE BONDING A STRUCTURE

[75] Inventors: Ken K. Yasui, Huntington Beach; Richard G. Pettit, La Habra, both of Calif.

[73] Assignee: McDonnell Douglas Corporation, Long Beach, Calif.

[21] Appl. No.: 54,227

[22] Filed: Apr. 30, 1993

[51] Int. Cl.⁵ .............................................. B23K 31/02
[52] U.S. Cl. .................................... 228/157; 228/175
[58] Field of Search ............... 228/118, 157, 175, 181, 228/190, 193

[56] References Cited

U.S. PATENT DOCUMENTS

| | | | |
|---|---|---|---|
| 3,927,817 | 12/1975 | Hamilton | 228/157 |
| 4,071,183 | 1/1978 | Cogan | 228/190 |
| 4,331,284 | 5/1982 | Schulz | 228/157 |
| 5,118,026 | 6/1992 | Stacher | 228/157 |

*Primary Examiner*—Samuel M. Heinrich
*Attorney, Agent, or Firm*—Donald E. Stout; John P. Scholl

[57] ABSTRACT

A process for forming single piece metal alloy panel structures includes both superplastic forming and braze bonding steps, and is particularly adapted to superplastically formable materials which are not particularly diffusion bondable, such as aluminum alloys. The process involves constructing a worksheet assembly from a plurality of worksheets which are associated with a brazing alloy capable of brazing the worksheets. At least two of the worksheets are joined in facing contact with each other by welding in a preselected pattern. The perimeter of the joined worksheets is then sealed, with the provision of means for permitting the admission of pressurized gas therebetween, after which the worksheet assembly is placed in a forming die. The actual structure forming process begins by heating the die and its associated worksheet assembly to a temperature suitable for superplastic forming, and simultaneously applying gas pressure at the means for admission of pressurized gas. The pressurized gas is applied to cause expansion of the sheets until the desired geometry of the structure has been attained. Following the superplastic forming step, the structure is braze bonded by ensuring that the die temperature is at or above the minimum brazing temperature of the brazing alloy for a specified period of time, thereby bonding at least some of the contacting surfaces of the structure together.

22 Claims, 2 Drawing Sheets

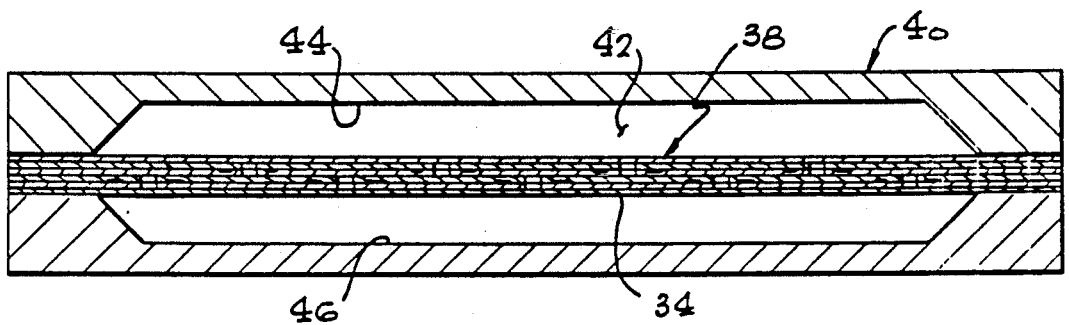
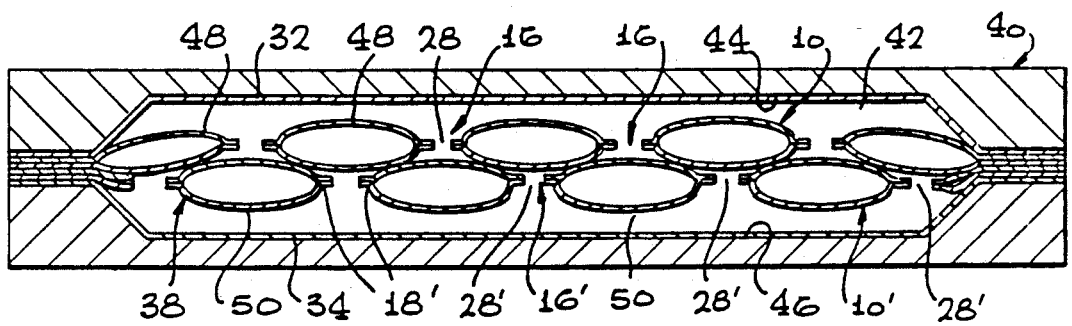
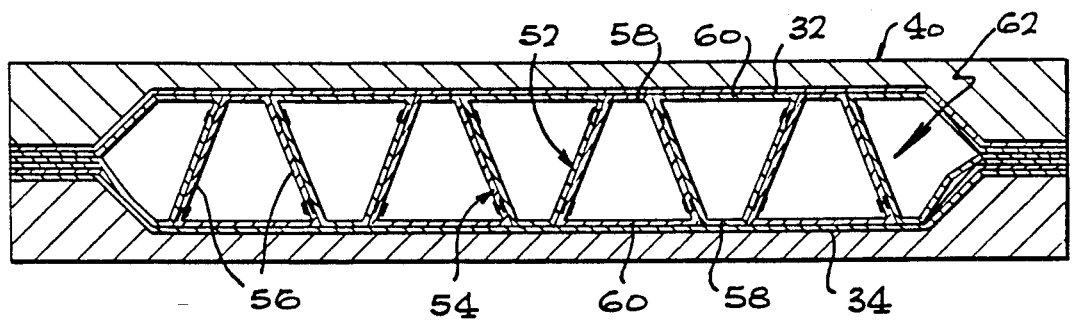
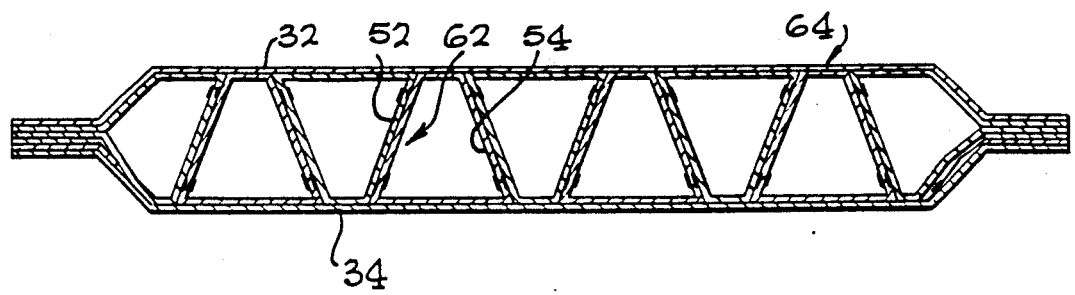

METHOD OF SUPERPLASTICALLY FORMING AND BRAZE BONDING A STRUCTURE

BACKGROUND OF THE INVENTION

This invention relates to the production of superplastically formed metal alloy panel structures, and is more particularly directed to a novel superplastic forming and braze bonding process which permits the use of a broader range of metal alloys than is feasible with the superplastic forming/diffusion bonding processes of the prior art.

The fabrication of a built-up panel structure by mechanical assembly of multiple metal parts is costly, and typically requires joining hardware which adds considerable weight and complexity to the structure. This is a particularly critical issue in the aerospace industry, where weight is an extremely important consideration. Panel structures fabricated by superplastic forming and diffusion bonding (SPF/DB) processes such as those disclosed in U.S. Pat. Nos. 4,217,397 and 5,141,146, both assigned to McDonnell Douglas Corporation, for example, have offered significant reductions in both cost and weight. However, aluminum and some other alloys are limited in their diffusion bonding capabilities due to surface oxidation or other metallurgical phenomena, and have thus not been suitable for fabrication of SPF/DB panels.

What is needed, therefore, is a novel and unique process which will permit the production of single piece structures using aluminum or other diffusion bond resistant alloys in a manner similar to that of the SPF/DB process, such that the fabrication cost will be relatively low and the part weight can be significantly reduced with respect to comparable built-up structure.

SUMMARY OF THE INVENTION

This invention solves the problem outlined above by teaching a process for forming single piece structures which is relatively simple and low cost, and results in a structure which is much lighter in weight than similar built up structures. The process includes the step of providing a plurality of worksheets made from a metal alloy having superplastic characteristics, preferably aluminum, with a brazing alloy capable of brazing the worksheets being associated with the worksheets. The brazing alloy may be either in the form of a coating on some or all of the worksheet surfaces, or in the form of a sheet or foil placed between pairs of worksheet surfaces which are to be bonded together in the formed completed structure. At least two of the worksheets are then joined in facing contact with each other by welding in a preselected pattern to form at least one set of joined worksheets. The perimeter of the joined worksheets is then sealed, with the provision of means for permitting the admission of pressurized gas therebetween, so that at least one worksheet assembly is produced. At this point, a forming die having at least one wall and defining a cavity therein is provided, and the at least one assembly is positioned within the cavity.

Once the worksheet assembly or assemblies is (are) in place, it is heated to a temperature suitable for superplastic forming. Simultaneously, gas pressure is applied at the means for admission of pressurized gas, thereby causing superplastic forming and expansion of at least one of the sheets into contact with the cavity wall(s). The pressurized gas is applied to cause further expansion of the sheets until the desired geometry of the structure has been attained. Following the superplastic forming step, the structure is braze bonded by ensuring that the die temperature is at or above the minimum brazing temperature of the brazing alloy for a specified period of time, thereby bonding at least some of the contacting surfaces of the structure together.

In another aspect of the invention, a process for producing a superplastically formed trusscore structure is disclosed in which first and second core elements are provided. Each of the core elements are formed of a pair of sheets made from a metal alloy having superplastic characteristics, with at least one of the sheets in each core element being associated with a brazing alloy capable of brazing the sheets. The worksheets are welded together along a plurality of pairs of spaced parallel weld lines, leaving space to permit free passage of gas between the sheets throughout the core element. A slot is provided between the weld lines of each of the pairs of weld lines, following which the core elements are placed together in face to face contact, with the pairs of weld lines in each of the core elements in parallel relation and the pairs of weld lines in the second core element displaced laterally from the pairs of weld lines of the first core panel.

After the core elements have been assembled, a first face sheet is applied in contact with the outer sheet of the first core element, and a second face sheet is applied in contact with the outer sheet of the second core element. The perimeter of the resulting assembly of core elements and face sheets is then sealed, while providing means for the admission of pressurized gas between the sheets of the core elements and in the space between each of the face sheets and the respective adjacent outer sheets of the first and second core elements.

The next step in the fabrication process is to provide a forming die having at least one wall and defining a cavity therein, after which the resulting assembly of sealed core elements and face sheets is placed therein. Then, the last mentioned assembly is heated to a temperature suitable for superplastic forming and gas pressure is simultaneously applied at the means for admission of pressurized gas, causing superplastic forming and expansion of the sheets of each core element, between adjacent pairs of weld lines, and expansion of the face sheets into contact with the wall(s) of the cavity. Application of pressurized gas is continued to cause further expansion of the sheets of each core element and formation of a plurality of successive substantially similar trapezoids having a pair of non-parallel sides from the expanded core sheets of the first and second core elements between the face sheets, adjacent trapezoids being in contact with each other and with the face sheets. The final step in the process is to ensure that the die temperature is at or above the minimum brazing temperature for the brazing alloy for a specified period of time, thereby braze bonding adjacent contacting surfaces of the trapezoids, and the contacting surfaces of the trapezoids and the face sheets.

The above mentioned and other objects and features of this invention and the manner of attaining them will become apparent, and the invention itself will be best understood, by reference to the following description taken in conjunction with the accompanying illustrative drawings.

BRIEF DESCRIPTION OF THE DRAWINGS

FIG. 4 is a cross-section of a die containing the assembly of FIG. 3;

FIG. 5 is a cross-section of the partially superplastically formed assembly of FIG. 3;

FIG. 6 is a cross-section of the final superplastically formed trusscore structure in the die; and FIG. 7 shows the final trusscore structure.

DETAILED DESCRIPTION OF THE DRAWINGS

The inventive process disclosed and claimed herein is particularly advantageous in that it permits the fabrication, using superplastic forming techniques, of complex single piece structures from materials heretofore not generally suited to superplastic forming because of their limited diffusion bonding capabilities. One such material of particular interest is aluminum, because of its importance in the aerospace industry. Aluminum is far less expensive, and in many cases more structurally efficient, than titanium, the best known superplastic forming material, and the ability to successfully fabricate aluminum parts using superplastic forming methods permits the use of superplastic forming to manufacture a much greater percentage of the components in a typical aerospace product. Because superplastically formed structures are much less expensive to manufacture than conventionally fabricated structures, and are also significantly lighter because of the reduction in required joining hardware, the inventive process will result in substantial cost reductions and performance improvements over state of the art aircraft.

Though the superplastic forming/braze bonding (SPF/BB) process of the invention is suitable to produce any structure now producible using known SPF/DB processes, such as the four sheet process disclosed in U.S. Pat. No. 4,217,397, for example, and may be employed in conjunction with a number of materials, it is preferred that it be employed to form structures from aluminum alloy sheet material. Because aluminum is highly conductive, insufficient heat is generated to properly weld the material using the roll seam welds employed in the four sheet process referenced above. Thus, the weld tends to be very wide, requiring a very high material strain in the forming of the panel. Since aluminum alloys typically have a limited strain capability, the wide weldment creates a risk of rupture in the fabricated structure. Consequently, a process similar to that disclosed in U.S. Pat. No. 5,141,146, commonly assigned and herein incorporated by reference, is preferred, since it is a low strain application wherein the size of the weldment is less important. Of course, other approaches may be desirable under certain circumstances, including the employment of alternate welding approaches which result in a narrow weld even for an aluminum application, such as electron beam welding or laser beam welding.

Figure 1:
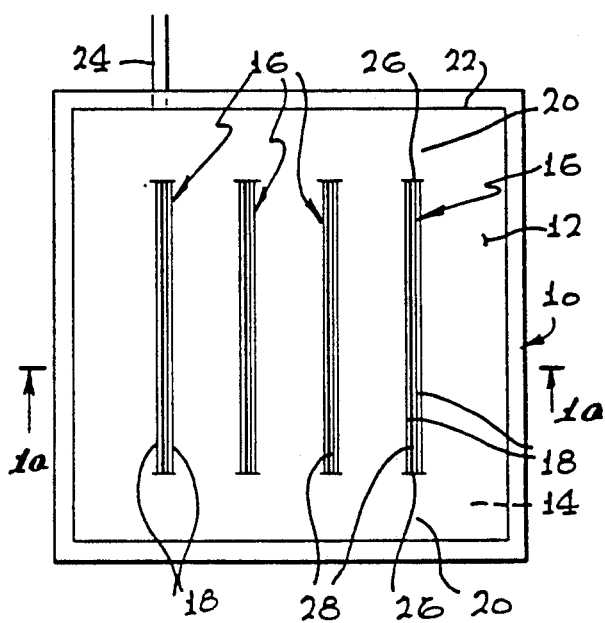
FIG. 1 is a plan view of a core element formed of a pair of superplastic metal worksheets welded together along a series of pairs of spaced parallel weld lines, with a slot between each pair of weld lines.
Figure 2:
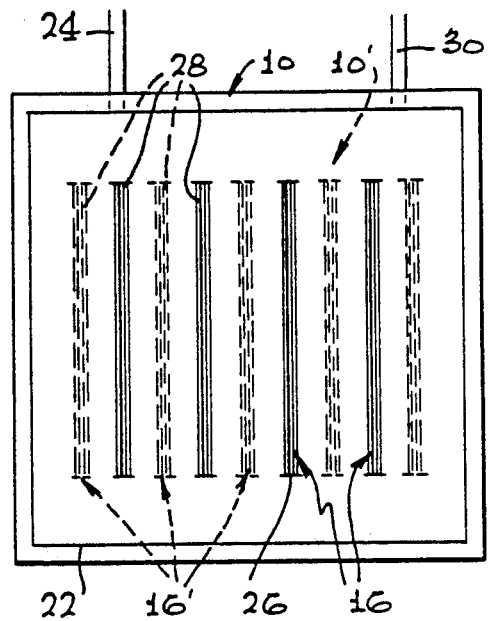
FIG. 2 is a plan view showing two of the core elements of FIG. 1 joined together, with the pairs of weld lines in one core element displaced laterally from the pairs of weld lines of the other core element.
Figure 1A:
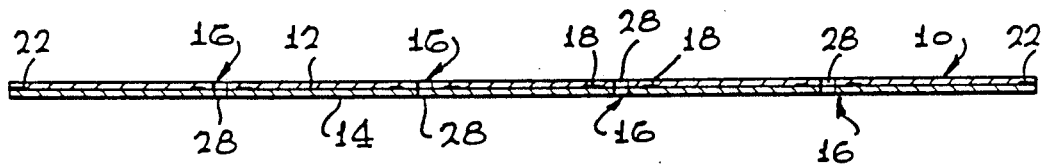
FIG. 1a is a section taken on line 1a—1a of FIG. 1.

Sandwich panels or panel structures according to the invention are constructed by combining core worksheets, and optionally face worksheets. Referring to FIGS. 1, 1a and 2 of the drawing, core elements 10 and 10' are each constructed of two superplastic metallic worksheets 12 and 14, preferably made of an aluminum alloy (possibly aluminum lithium or aluminum beryllium), though other materials having superplastic characteristics may be employed as well. Each sheet 12 and 14 is coated with alloys capable of brazing the sheets. Preferably, the coating is applied using a cladding process, but it could also be applied by plating, plasma spraying, or other such coating techniques which are well known in the art. Alternatively, brazing sheet or foil may be inserted between contacting surfaces of the worksheets. The melting point of the brazing alloy is designed to be approximately equal to or higher than the superplastic forming temperature. Preferably, the sheets 12 and 14 are welded together along an even number, here shown as four, pairs 16 of spaced parallel weld lines 18, leaving sufficient space to create gas passages at the ends of the welds, as at 20, to permit uniform passage of gas to balance the gas pressure between the metal sheets of the core element during the forming process. The two metallic sheets 12 and 14 are also welded as by a continuous seam weld at 22 around the periphery of the sheets, leaving a gas inlet at 24 to the space between sheets 12 and 14. Each pair of weld lines 18 are closely spaced, e.g. about ⅛ inch between them, and the weld lines 18 of each pair of weld lines are of substantially the same length, and they are connected as by roll seam welding at 26 at both ends of the parallel weld lines 18. It is seen that the distance between the pairs 16 of weld lines 18, is substantially greater than the distance between the weld lines 18 of each pair of such weld lines. The core element 10 is provided with a slot 28 midway between the adjacent weld lines 18, the slot 28 being cut completely through each of the sheets 12 and 14. The slots extend parallel to weld lines 18 of each pair 16 of such weld lines and are positioned between weld lines 18, approximately midway between such weld lines and extend for a length just short of the length of weld lines 18, to the end welds 26. Slots 28 do not extend across the end welds 26.

Figure 3:
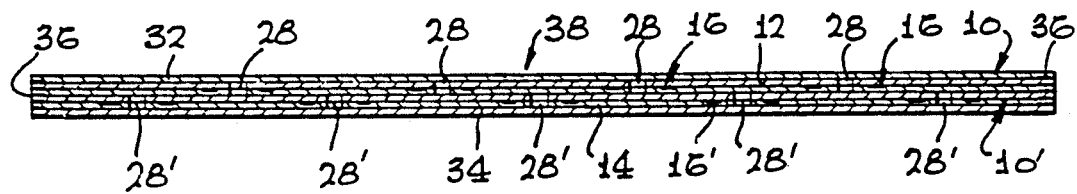
FIG. 3 is a cross-section of the assembly of FIG. 2 and also including face sheets in contact with the outer sheet of each of the upper and lower core elements.

The other core element 10', as seen in FIGS. 2 and 3 is of the same construction as core element 10, except that core element 10' has an odd number, here shown as five, pairs of weld lines, designated 16'. The distance between the pairs of weld lines 16' of core element 10' is the same as the distance between the pairs of weld lines 16 of core element 10. The core element 10' has a gas inlet 30 to the space between sheets 12 and 14 of core element 10'.

The two core elements 10 and 10' are placed together, core element 10 over core element 10'. It will be noted that in this position, the pairs of weld lines 16 and 16' in both of the core elements are parallel, and the pairs of weld lines 16' in core element 10' are displaced or staggered laterally from the pairs of weld lines 16 in core element 10. More specifically, according to preferred practice, the pairs of weld lines 16', as well as the slots 28', of the lower core element 10' are positioned midway between the pairs of weld lines 16 and slots 28 of the upper core element 10.

In the preferred embodiment, a face worksheet 32 is then placed in contact with the outer sheet 12 of the upper core element 10 and a face worksheet 34 is placed in contact with the outer sheet 14 of the lower core element 10'. It should be noted that under some circumstances, it may be preferable not to utilize face sheets. Face sheets 32 and 34 are preferably of the same material as core sheets 12 and 14, and are preferably clad with the same brazing alloy as the core sheets 12 and 14. It is important to note that in some applications it may be preferable to only clad one or some of the core and face worksheets with the brazing material, perhaps only on one side (the contacting side), and it should again be emphasized that other coating techniques could be used. As discussed previously, another potential alternative is to employ a brazing sheet or foil inserted between each set of worksheets having surfaces which are desired to be bonded together in the superplastically formed structure as finally configured. The resulting assembly as shown in FIG. 3 is then sealed around the periphery, as by welding at 36. Gas inlets (not shown) are provided for introduction of pressurized gas into the space between each of the face sheets 32 and 34 and the respective adjacent outer sheets 12 and 14 of core elements 10 and 10'.

The resulting forming pack assembly 38 is placed in the cavity 42 of a forming die 40, as seen in FIG. 4, having walls 44 and 46. The die is heated to a first temperature suitable for superplastic forming. This temperature ranges from about 600° F. to about 1200° F., being about 750° F. for Al 2024 and about 1000° F. for aluminum lithium 8090. Gas pressure is applied to the spaces between the face sheets 32 and 34 and the adjacent outer sheets 12 and 14 of core elements 10 and 10' respectively, to cause superplastic forming and expansion of face sheets 32 and 34 into contact with walls 44 and 46 of die cavity 42, as seen in FIG. 5. Gas pressure is also applied through gas inlets 24 and 30 into the interior of core elements 10 and 10', between adjacent sheets 12 and 14 thereof, causing superplastic forming and expansion of sheets 12 and 14 of both core elements, between adjacent pairs 16 of weld lines of core element 10 and between adjacent pairs 16' of weld lines of core element 10'. In the partially expanded condition of the forming pack assembly 38 as shown in FIG. 5, there are formed a top series of bulges 48 between adjacent pairs of weld lines 16 of top core element 10 and a second series of bulges 50 between adjacent pairs of weld lines 16' of bottom core element 10'. The bulges 50 of core element 10' are displaced laterally from the bulges 48 of core element 10. The bulges 50 are disposed symmetrically between the bulges 48, with the bulges 48 positioned opposite the slots 28' in core element 10', and the bulges 50 positioned opposite the slots 28 in core element 10. It is noted that during this period of superplastic forming and expansion, the width of slots 28 and 28' of core elements 10 and 10', between adjacent bulges 48 and between bulges 50, widened. It is also noted that bulges 48 make contact with adjacent bulges 50.

While applying sufficient gas pressure in the space between each of the face sheets 32 and 34, and the respective adjacent outer sheets 12 and 14 of core elements 10 and 10' to maintain the face sheets 32 and 34 in contact with the walls 44 and 46 of die cavity 42, increasing gas pressure is continued to be applied through gas inlets 24 and 30, causing further superplastic forming and expansion of the bulges 48 and 50 of core elements 10 and 10'. As seen in FIG. 6, this results in formation of a first series of substantially similar trapezoids 52 from core element 10 between face sheets 32 and 34, and a second series of substantially similar trapezoids 52 from core element 10' between the face sheets, the trapezoids 52 and 54 each having a pair of non-parallel sides 56. Trapezoids 52 and 54 have the same shape, and trapezoids 52 are inverted with respect to trapezoids 54, and nest between each other, and the sides of trapezoids 52 are in contact with the sides of adjacent trapezoids 54, the parallel top 58 and the bottom 60 of each of the trapezoids being in contact with face sheets 32 and 34.

After completion of the superplastic forming process, the die temperature is increased from the superplastic forming temperature to the brazing temperature, to complete the bonding cycle. The brazing temperature level depends upon both the forming sheet alloy and the brazing alloy which is used for a particular process. For example, if the superplastic forming temperature is 950° F. for the particular forming sheet alloy used, a brazing alloy may be selected which has a brazing temperature of about 1100° F. It is important to note that in some instances it may be desirable to employ a single step forming and brazing cycle, wherein the brazing temperature will be approximately equal to the superplastic forming temperature. If this is the case, no further heating step will be required, and the braze bonding step merely involves ensuring that the die temperature is at or above the minimum brazing temperature of the brazing alloy for a specified period of time adequate to complete the bonding cycle. During the bonding cycle, the contacting sides of trapezoids 52 and 54 become braze bonded to each other, and the contacting top and bottom of trapezoids 52 and 54 and the adjacent contacting areas of face sheets 32 and 34 become braze bonded, forming the core sheet or web 62 between face sheets 32 and 34. The resulting trusscore structure 64 is removed from the forming die 40 after cooling, as shown in FIG. 7.

Although an exemplary embodiment of the invention has been shown and described, many changes, modifications, and substitutions may be made by one having ordinary skill in the art without departing from the spirit and scope of the invention. Therefore, the invention is not to be limited except by the scope of the appended claims.

What is claimed is:

1. A process for forming a structure, comprising:

providing a plurality of worksheets made from a metal alloy having superplastic characteristics, a brazing alloy capable of brazing said worksheets being associated therewith;

joining at least two of said worksheets in facing contact with each other by welding in a preselected pattern to form at least one set of joined worksheets;

sealing the perimeter of said joined worksheets while providing means for the admission of pressurized gas therebetween, thereby producing at least one worksheet assembly;

providing a forming die having at least one wall and defining a cavity therein;

positioning said at least one assembly in said cavity;

heating said worksheet assembly to a temperature suitable for superplastic forming and applying gas pressure at said means for admission of pressurized gas, causing superplastic forming and expansion of at least one of said sheets into contact with said at least one cavity wall;

continuing to apply said pressurized gas to cause further expansion of said sheets until the desired geometry of said structure has been attained; and braze bonding said formed structure by ensuring that the die temperature is at or above the minimum brazing temperature of said brazing alloy for a specified period of time, thereby bonding at least some of the contacting surfaces of said structure together.

2. The process of claim 1, wherein said brazing alloy comprises an aluminum silicon alloy.

3. The process of claim 1, wherein the braze bonding step includes the step of heating said worksheet assembly to a braze bonding temperature which is higher than said superplastic forming temperature.

4. The process of claim 1, wherein the superplastic forming temperature ranges from about 600° F. to about 1200° F. and said braze bonding temperature ranges from about 700° F. to about 1300° F.

5. The process of claim 1, wherein said metal alloy comprises an aluminum alloy.

6. The process of claim 1, wherein at least one of said worksheets is coated on at least one side with said brazing alloy.

7. The process of claim 6, wherein said brazing alloy coating is applied by cladding, plating, or plasma spraying said brazing alloy on said at least one worksheet.

8. The process of claim 6, wherein all of said worksheets are coated with said brazing alloy.

9. The process of claim 8, wherein said brazing alloy coating is applied by cladding, plating, or plasma spraying said brazing alloy on said worksheets.

10. The process of claim 1, wherein said brazing alloy comprises at least one sheet of material, which is inserted between at least two of said worksheets prior to the joining step.

11. The process of claim 1, wherein said worksheet providing step includes the step of inserting brazing sheets between each set of worksheets having surfaces which are desired to be bonded together in the superplastically formed structure as finally configured.

12. The process of claim 1, wherein said worksheet providing step includes providing at least one core element formed of a pair of said worksheets, at least one of said core element worksheets being associated with said brazing alloy, said joining step joining said at least two core worksheets, said process further including:
applying a face sheet associated with said brazing alloy in contact with the outer sheet of each core element to form said worksheet assembly, said sealing step involving sealing the perimeter of the resulting worksheet assembly of said at least one core element and corresponding face sheet, while providing means for the admission of pressurized gas between the sheets of said core element and in the space between each core element and its corresponding face sheet.

13. The process of claim 12, wherein at least one of said sheets in each core element is coated with said brazing alloy, and wherein each said face sheet is coated with said brazing alloy.

14. The process of claim 12, wherein a sheet of said brazing alloy is inserted between the pair of worksheets in each said core element during the worksheet providing step, and a sheet of said brazing alloy is oriented between each said face sheet and its associated core element outer sheet during the applying step.

15. A process for producing a superplastically formed trusscore structure which comprises:
providing first and second core elements, each of said elements formed of a pair of sheets made from a metal alloy having superplastic characteristics, at least one of said sheets in each core element being associated with a brazing alloy capable of brazing said sheets, said sheets being welded together along a plurality of pairs of spaced parallel weld lines, leaving space to permit free passage of gas between the sheets throughout the core element;
providing a slot between the weld lines of each of said pairs of weld lines;
placing said core elements together in face to face contact, with the pairs of weld lines in each of said core elements in parallel relation and the pairs of weld lines in said second core element displaced laterally from the pairs of weld lines of said first core panel;
applying a first face sheet in contact with the outer sheet of said first core element, and a second face sheet in contact with the outer sheet of said second core element;
sealing the perimeter of the resulting assembly of core elements and face sheets, while providing means for the admission of pressurized gas between the sheets of said core elements and in the space between each of said face sheets and the respective adjacent outer sheets of said first and second core elements;
providing a forming die having at least one wall and defining a cavity therein;
placing the resulting assembly of sealed core elements and face sheets in said cavity; and
heating said last mentioned assembly to a temperature suitable for superplastic forming and applying gas pressure at said means for admission of pressurized gas, causing superplastic forming and expansion of said sheets of each said core element, between adjacent pairs of weld lines, and expansion of said face sheets into contact with the at least one wall of said cavity;
continuing to apply said pressurized gas to cause further expansion of said sheets of each core element and formation of a plurality of successive substantially similar trapezoids having a pair of non-parallel sides from the expanded core sheets of said first and second core elements between said face sheets, adjacent trapezoids being in contact with each other and with said face sheets, and
ensuring that the die temperature is at or above the minimum brazing temperature for said brazing alloy for a specified period of time, thereby braze bonding adjacent contacting surfaces of said trapezoids, and the contacting surfaces of said trapezoids and said face sheets.

16. The process of claim 15, wherein said brazing alloy comprises an aluminum silicon alloy.

17. The process of claim 15, wherein the braze bonding step includes the step of heating said worksheet assembly to a braze bonding temperature which is higher than said superplastic forming temperature.

18. The process of claim 15, wherein the superplastic forming temperature ranges from about 600° F. to about 1200° F. and said braze bonding temperature ranges from about 700° F. to about 1300° F.

19. The process of claim 15, wherein said metal alloy comprises an aluminum alloy.

20. The process of claim 15, wherein said at least one core element sheet is coated on at least one side with said brazing alloy.

21. The process of claim 15, wherein all of said core worksheets and said face worksheets are coated with said brazing alloy.

22. The process of claim 15, wherein said brazing alloy comprises one or more sheets, said brazing sheets being inserted between contacting surfaces of said core worksheets, and between contacting surfaces of said face worksheets and the outer sheets of said core elements.

* * * * *